US009853860B2

(12) United States Patent
Bhogal et al.

(10) Patent No.: US 9,853,860 B2
(45) Date of Patent: Dec. 26, 2017

(54) APPLICATION HIERARCHY SPECIFICATION WITH REAL-TIME FUNCTIONAL SELECTION

(71) Applicant: International Business Machines Corporation, Armonk, NY (US)

(72) Inventors: Kulvir S. Bhogal, Fort Worth, TX (US); Jonathan F. Brunn, Logan, UT (US); Jeffrey R. Hoy, Gibsonia, PA (US); Asima Silva, Holden, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 239 days.

(21) Appl. No.: 14/754,134

(22) Filed: Jun. 29, 2015

(65) Prior Publication Data

US 2016/0380811 A1 Dec. 29, 2016

(51) Int. Cl.
*H04L 12/24* (2006.01)
*H04L 29/06* (2006.01)
*H04L 12/26* (2006.01)

(52) U.S. Cl.
CPC .......... *H04L 41/0803* (2013.01); *H04L 69/24* (2013.01)

(58) Field of Classification Search
CPC ... G01C 21/32; G06F 12/123; G06F 11/2056; H04L 67/10; H04L 41/0803; H04L 67/34;
(Continued)

(56) References Cited

U.S. PATENT DOCUMENTS 8,769,032 B2   7/2014   Ginevan et al.
9,094,363 B1 *  7/2015   Lin ................... H04L 51/36
(Continued)

FOREIGN PATENT DOCUMENTS

EP    0676693 B1   10/1995
WO    2010047773 A2   4/2010
WO    2013105115 A2   7/2013

OTHER PUBLICATIONS

Author Unknown, System for Identifying and Suggesting One or More Communication Applications for Communication Among Users, Technical Disclosure IPCOM000231133D, Sep. 30, 2013, pp. 1-3, IP.com, Published online at: https://priorart.ip.com/IPCOM/000231133.

*Primary Examiner* — Sargon Nano
(74) *Attorney, Agent, or Firm* — Lee Law, PLLC; Christopher B. Lee (57) ABSTRACT

A preferred communication application hierarchy that specifies user priorities for application selection for communication sessions and functional communication capabilities of each prioritized application is configured for at least one user of a group of users. A real-time communication request, initiated by a user with a configured preferred communication application hierarchy, is detected that specifies a particular type of communication functionality and that includes an indication of another one of the group of users as a requested communication recipient. Responsive to detecting the real-time communication request that specifies the particular type of communication functionality, a highest-priority application usable to perform the specified particular type of communication functionality with a communication device of the requested communication recipient is selected from the configured preferred communication application hierarchy of the requesting user.

20 Claims, 4 Drawing Sheets (58) Field of Classification Search
CPC . H04L 67/2823; H04L 41/0806; H04W 48/18
See application file for complete search history.

(56) References Cited

U.S. PATENT DOCUMENTS

| | | | | |
|---|---|---|---|---|
| 9,461,876 | B2* | 10/2016 | Van Dusen | H04L 41/04 |
| 2005/0246240 | A1* | 11/2005 | Padilla | G06Q 10/06 |
| | | | | 705/26.3 |
| 2008/0263451 | A1* | 10/2008 | Portele | G06F 3/167 |
| | | | | 715/727 |
| 2010/0329182 | A1* | 12/2010 | Wigard | H04W 48/10 |
| | | | | 370/328 |
| 2012/0278262 | A1 | 11/2012 | Morgenstern et al. | |
| 2012/0296975 | A1 | 11/2012 | Ghorbel et al. | |
| 2013/0144950 | A1 | 6/2013 | Sanakaranarasimhan et al. | |
| 2014/0149908 | A1* | 5/2014 | Jeon | G06F 3/04886 |
| | | | | 715/769 |
| 2015/0199525 | A1* | 7/2015 | Fujii | G06Q 10/00 |
| | | | | 707/783 |
| 2015/0220127 | A1* | 8/2015 | Kukoyi | H04W 52/0258 |
| | | | | 713/340 |
| 2016/0088419 | A1* | 3/2016 | Annapureddy | H04W 4/003 |
| | | | | 455/414.1 |
| 2016/0103668 | A1* | 4/2016 | Srinivasan | G06F 8/61 |
| | | | | 717/178 |

\* cited by examiner

APPLICATION HIERARCHY SPECIFICATION WITH REAL-TIME FUNCTIONAL SELECTION

BACKGROUND

The present invention relates to cross-application functional interaction. More particularly, the present invention relates to application hierarchy specification with real-time functional selection.

Users of computing devices may utilize computer-based applications for work or for enjoyment. Computer-based applications to perform work may include text editors, spreadsheet applications, and scheduling applications. Computer-based applications for enjoyment may include video games, card games, and other types of games.

SUMMARY

A method includes configuring, by a processor for at least one user of a plurality of users, a preferred communication application hierarchy that specifies user priorities for application selection for communication sessions and functional communication capabilities of each prioritized application; detecting a real-time communication request, initiated by a user with a configured preferred communication application hierarchy, that specifies a particular type of communication functionality and that comprises an indication of another one of the plurality of users as a requested communication recipient; and selecting, responsive to detecting the real-time communication request that specifies the particular type of communication functionality, from the configured preferred communication application hierarchy of the requesting user a highest-priority application usable to perform the specified particular type of communication functionality with a communication device of the requested communication recipient.

A system that performs the method and a computer program product that causes a computer to perform the method are also described.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides application hierarchy specification with real-time functional selection. The present technology solves an application use and interconnection problem by providing technology that includes a new form of real-time programmatic application selection according to a user-specified hierarchy of application selection preferences and functionality to be utilized to interconnect and communicate with another computing application of another user. Users may utilize the highest-priority application they have in common, or may utilize a preferred application that provides appropriate underlying protocol and communications functionality to perform the desired communication. A suggestion of which application a user should use for a desired function when corresponding with another user may be provided, while taking into account the respective application communication capabilities and the respective user-designated prioritized application preferences. To avoid use of trademarks, names of commercially-available applications are omitted from this description, with reference instead to an application "A," and application "B," and others as appropriate for the given examples. Further, respective users are referred to as user_1, user_2, and others as appropriate for the given examples.

The present technology operates by configuring a preferred communication application hierarchy for each user of a group of users that specifies, for each user, user priorities for application selection for communication sessions and functional communication capabilities of each prioritized application. A real-time communication request, initiated by a user with a configured preferred communication application hierarchy, is detected that specifies a particular type of communication functionality. The real-time communication request also includes an indication that at least one other user is a requested communication recipient. A highest-priority application that is usable to perform the specified particular type of communication functionality with a communication device of the requested communication recipient(s) is selected from the configured preferred communication application hierarchy of the requesting user.

As will be described in more detail below, the technology described herein provides two modes of hierarchical application preference selection. Each of the two modes operates in accordance with one or more configured preferred communication application hierarchies of one or more of the respective communicating users.

Under each mode of hierarchical application preference selection, individual users may specify their respective preferred communication application hierarchies that prioritize application preferences of the respective users for different communication purposes (e.g., hierarchies for video conferencing, hierarchies for voice communications, hierarchies for instant messaging (IM), hierarchies for short message services (SMS), hierarchies for texting, hierarchies for screen sharing, and hierarchies for other forms of communication). The preferred communication application hierarchies for each form of communication functionality may be combined into a multi-application preference profile for the user, with a different preferred communication application hierarchy specified for each of multiple types of communication functionality. The examples below utilize video conferencing for purposes of example, though it is understood than any other form of communications such as those listed above and others may be implemented in conjunction with the technology described herein.

Regarding the first mode of hierarchical application preference selection, functionality to be utilized during a communication session, such as the underlying communication protocol (e.g., "H.323 standard" for video conferencing, etc.), may be used as a basis for the user to select a highest-priority application. As such, each user may utilize a different application for the application-level interface and communications may still be performed using a common protocol under this first mode of hierarchical application preference selection.

Under the second mode of hierarchical application preference selection, the users' application-use preferences may be prioritized and queried in response to a request from either user to initiate communications. A highest-priority application that the users have in common within their respective prioritized lists may be selected for the communication session. As such, under the second mode of hierarchical application preference selection, the users each utilize the same application-level interface and the application selection is performed based upon the users' stated prioritized application-use preferences. The communication protocol still remains the same between the two applications.

Where users have multiple applications that may be used on their respective hardware platforms for communication purposes, the users may specify their respective hierarchies of application-use preferences. These hierarchies of application-use preferences may be registered with an application preference-management server. The application preference-management server may preserve user privacy through user approval-based opt-in processing.

As an example use of the first mode of hierarchical application preference selection, where two users desire to communicate over a given protocol, each of the two users may use their own preferred application to communicate during the communication session. For example, the H.323 standard defines the protocols that provide audio-visual communication sessions over a packet-based network. Various applications may support the H.323 protocol, and the respective users may prefer one application over another, or their hardware platform may support only one or a subset of the available applications that implement the H.323 standard. By use of the technology described herein, a user_1 may specify that they want application "X" to be used when another user wants to communicate with user_1 via a video conference call using the H.323 protocol. User_1 may have application X and an application "Y" installed, and may specify that application X has priority over application Y. Alternately, a user_2 may want to use application Y even though user_2 has application X installed on their device, and may specify use of application Y as a priority over application X. Given that both application X and application Y support communication using H.323, the technology described herein augments processing to implement a handshake between the two different applications to confirm use of H.323 for protocol processing with the different application layers of the respective applications used for the respective user application-layer interfaces, thereby allowing the respective users to use their applications of choice. It should be noted that any differences in application-layer formatting of information used to communicate between the two different applications may also be resolved during the handshake, and one of the two applications or the underlying technology described herein may perform application-layer translation of the application-layer information formatting suitable for use by the other of the respective applications. As such, the technology described herein forms a technological bridge between different user applications based upon the functional technical underpinnings of the communication technology to be used for the inter-application communications.

As an example use of the second mode of hierarchical application preference selection, and again using video conferencing as an example, user_1 may designate a preferred application hierarchy of application A, then application B, and then application C. This information may then be registered with an application preference-management server. Similarly, user_2 may designate application C, then a different application D as their preferred application hierarchy for video conferencing.

Once the users register their respective hierarchies of application-use preferences with the application preference-management server, when user_1 attempts to contact user_2 and specifies a request for a video conference, the preferred applications that provide the communication functionality between the two users may be compared. In this example, application C may be seen to be the application that the two users have in common within their respective hierarchies of application-use preferences, and the application preference-management server may select application C to be invoked on device of user_1 to contact user_2. The reception of the invoked communication may then initiate communications with the application C on the device of user_2.

With the respective users' hierarchies of application-use preferences registered, the application preference-management server may suggest an application for use by a set of users based on combined user priorities at a time of initiating communication. The application preference-management server may enable use of the suggested application for use on the respective users' devices, such as by recommending the suggested application. Alternatively, where it is determined that a majority of users highly-prioritize a given application, and another user does not have the highly-prioritized application listed, the application preference-management server may suggest to the other user that the user download the application to correlate the user's communication options with the majority of users. The application preference-management server may also predict user preferences for application selection based upon features of applications within the respective user's hierarchy of application-use preferences to suggest additional/new applications.

Further regarding suggesting applications to users, if user_1 tries to use application A to video conference with user_2, and user_2 does not have the application A installed (but user_2's device supports execution of application A), the application preference-management server may inform user_1 that user_2 does not have application A installed and suggest use of an alternative application that is listed within each user's hierarchy of application-use preferences instead (e.g., suggest use of application C). Alternatively, the application preference-management server may inform user_2 that user_1 is attempting to utilize application A to contact user_2 and suggest that user_2 consider downloading application A since user_1 is trying to contact user_2 using application A. The application preference-management server may further inform user_2 that a majority of his/her contacts have specified application A as their preferred video conferencing application, and that as such user_2 may communicate with more of his/her contacts by use of application A. The application preference-management server may also assist user_2 in downloading application A responsive to an affirmative response from user_2.

Further regarding identity and privacy controls, in order for communication between applications to be established, application identifiers (IDs) for the applications may be maintained, and optionally stored on the application preference-management server as part of a user's hierarchy of application-use preference registration information. If the application IDs are not stored as part of the user hierarchy of application-use preference registration information on the application preference-management server, the application IDs may be transmitted along with the user's application hierarchy when making a communication request. Similarly, when a user receives a request for communication, that user's application IDs may be previously stored on the application preference-management server or transmitted in response to the identified application for communication. The list of installed applications may follow the same pattern of privacy, where a list of the user's hierarchy of application-use preferences is stored on the application preference-management server if the user desires, or the user may opt-in/authorize sharing of the list of the user's hierarchy of application-use preferences when establishing communications.

The technology described herein may further be integrated with an application store (e.g., an "App Store") to determine which applications the user has available on the user's device. The technology may further be integrated into the applications themselves or a statistics repository to identify which methods of communication the user is most likely to use. When loading an application, the platform or system agent may give the user an option to make the application the user's default for rankings and user communications. Ranking of preferences may be automatically detected based on frequency of use of a particular application. For example, if user_1 frequently uses application B, and infrequently uses application A, application B may be ranked higher than application A. Automatic ranking may additionally take into account other mineable types of data, such as time of day of usage, content of usage, communication participants and other information as appropriate for a given implementation.

For applications where the user has no usage pattern, preferred ranking may be generated by evaluation of application-use preferences of other users with whom the respective user is determined to likely to communicate. For example, if user_1 never uses video conferencing, and a request is received to identify a preferred video conferencing application of user_1, a top-choice application from a combination of the other users with whom user_1 is likely to communicate may be derived based on mineable data of similar requests to other users.

As such, many possibilities exist for implementation of the present technology. Accordingly, any such possibilities may be implemented as appropriate for the given implementation, and are considered within the scope of the present description.

It should be noted that conception of the present subject matter resulted from recognition of certain limitations associated with communication between user applications. For example, it was observed that when a user uses a mobile phone, each user may have an option to carry out a desired communication function via multiple different applications. To avoid use of trademarks, names of commercially-available applications are omitted from this description. However, to further the present example without use of trademarks, if one user wants to video conference with another user, each user may have their own preference for their respective application of choice based upon the user's perceived ease of use of different applications, the user's individual respective knowledge about feature utilization of different applications, or other factors that may be different between the respective users. The choice of which application to use to correspond with another user is sometimes further complicated by a platform dependency, such as where a particular mobile platform only supports a subset of available applications (e.g., one of many). It was determined from these several observations that prior technologies do not take into account platform dependencies and capabilities of different applications when users desire to communicate with one another. It was further determined that, as a result, users are often forced to utilize unfamiliar applications or applications that they perceive as more difficult to use when communicating with other users. It was further determined that these problems may be solved by new technology that allows users to specify application-use preference hierarchies, and that utilizes functional capabilities of the hierarchical applications to select and recommend use of a highest-priority application that provides the underlying functionality suitable for an individual communication session. It was also determined that it was desirable for this new form of technology to move beyond application-centric limitations and constraints, to allow communicating users to utilize different applications in circumstances where the different applications provide a common protocol or communication capability. The present subject matter improves user communication by providing for user-specified hierarchical application-use preference specification and application selection that allows communication using a user's desired application and platform, as described above and in more detail below. As such, improved user communication experiences and efficiency may be obtained through use of the present technology.

The application hierarchy specification with real-time functional selection described herein may be performed in real time to allow prompt and prioritized determination and selection of applications suitable for communication sessions between users. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
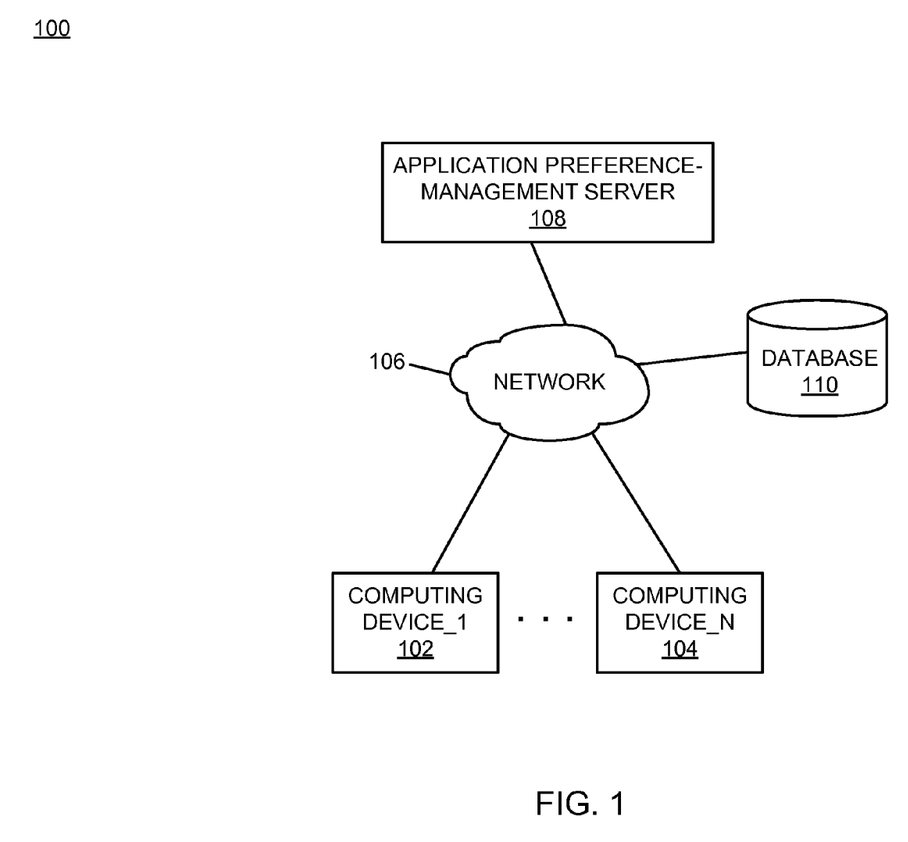
FIG. 1 is a block diagram of an example of an implementation of a system for application hierarchy specification with real-time functional selection according to an embodiment of the present subject matter.

FIG. 1 is a block diagram of an example of an implementation of a system 100 for application hierarchy specification with real-time functional selection. A computing device_1 102 through a computing device_N 104 communicate via a network 106 with one another using different types of protocols according to the communications being performed (e.g., video, audio, text, etc.). An application preference-management server 108 configures and manages a preferred communication application hierarchy for one or more users of each communication device 102 through 104. The configured preferred communication application hierarchies may each include user preferences/priorities for application selection for communication sessions and functional communication capabilities of each prioritized application. The application preference-management server 108 may store the configured preferred communication application hierarchies of the respective users within a database 110.

As will be described in more detail below in association with FIG. 2 through FIG. 4, the computing device_1 102 through the computing device_N 104 and/or the application preference-management server 108 may provide automated application hierarchy specification with real-time functional selection. The automated application hierarchy specification with real-time functional selection is based upon user specification of application priorities for communication purposes, and cross-referencing of configured preferred communication application hierarchies of communicating users to determine a highest-priority application for each user to perform the requested communication session. The selected applications for a communication session may be different applications that each support the requested particular type of communication protocol (e.g., H.323, etc.), or may be identical applications where each user has the same application listed at any location within their prioritized list. The present technology may be implemented at a user computing device or server device level, or by a combination of such devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The application preference-management server 108 may include any device capable of providing data for consumption by a device, such as the computing device_1 102 through the computing device_N 104, via a network, such as the network 106. As such, the application preference-management server 108 may include a web server, an application server, or other data server device.

The database 110 may include a relational database, an object database, or any other storage type of device. As such, the database 110 may be implemented as appropriate for a given implementation.

Figure 2:
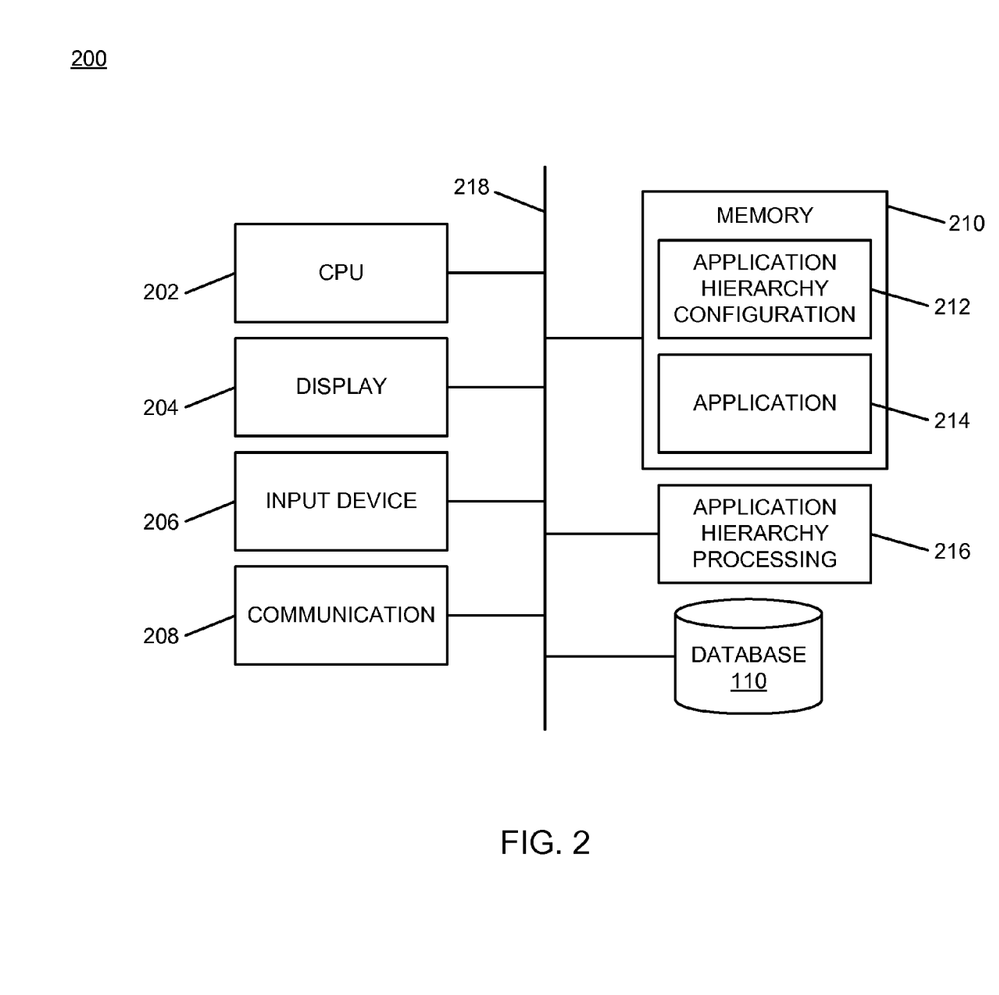
FIG. 2 is a block diagram of an example of an implementation of a core processing module capable of performing application hierarchy specification with real-time functional selection according to an embodiment of the present subject matter.

FIG. 2 is a block diagram of an example of an implementation of a core processing module 200 capable of performing application hierarchy specification with real-time functional selection. The core processing module 200 may be associated with either the computing device_1 102 through the computing device_N 104 or with the application preference-management server 108, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of application hierarchy information in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes an application hierarchy configuration area 212 that stores prioritized application hierarchy and application functionality information within the core processing module 200. The memory 210 also includes an application area 214 that provides storage and execution space for one or more applications that may be used to communicate with other devices (e.g., video conferencing, audio communications, text messaging, etc.).

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An application hierarchy processing module 216 is also illustrated. The application hierarchy processing module 216 provides configuration and processing capabilities for preferred communication application hierarchies within the core processing module 200, as described above and in more detail below. The application hierarchy processing module 216 implements the automated application hierarchy specification with real-time functional selection of the core processing module 200.

It should also be noted that the application hierarchy processing module 216 may form a portion of other circuitry described without departure from the scope of the present subject matter. Further, the application hierarchy processing module 216 may alternatively be implemented as an application stored within the memory 210. In such an implementation, the application hierarchy processing module 216 may include instructions executed by the CPU 202 for performing the functionality described herein. The CPU 202 may execute these instructions to provide the processing capabilities described above and in more detail below for the core processing module 200. The application hierarchy processing module 216 may form a portion of an interrupt service routine (ISR), a portion of an operating system, a portion of a browser application, or a portion of a separate application without departure from the scope of the present subject matter.

The database 110 is again shown within FIG. 2 associated with the core processing module 200. As such, the database 110 may be operatively coupled to the core processing module 200 without use of network connectivity, as appropriate for a given implementation.

The CPU 202, the display 204, the input device 206, the communication module 208, the memory 210, the application hierarchy processing module 216, and the database 110 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor (s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many possible arrangements for components of the core processing module 200 are possible and all are considered within the scope of the present subject matter. It should also be understood that, though the database 110 is illustrated as a separate component for purposes of example, the information stored within the database 110 may also/alternatively be stored within the memory 210 without departure from the scope of the present subject matter. Accordingly, the core processing module 200 may take many forms and may be associated with many platforms.

Figure 3:
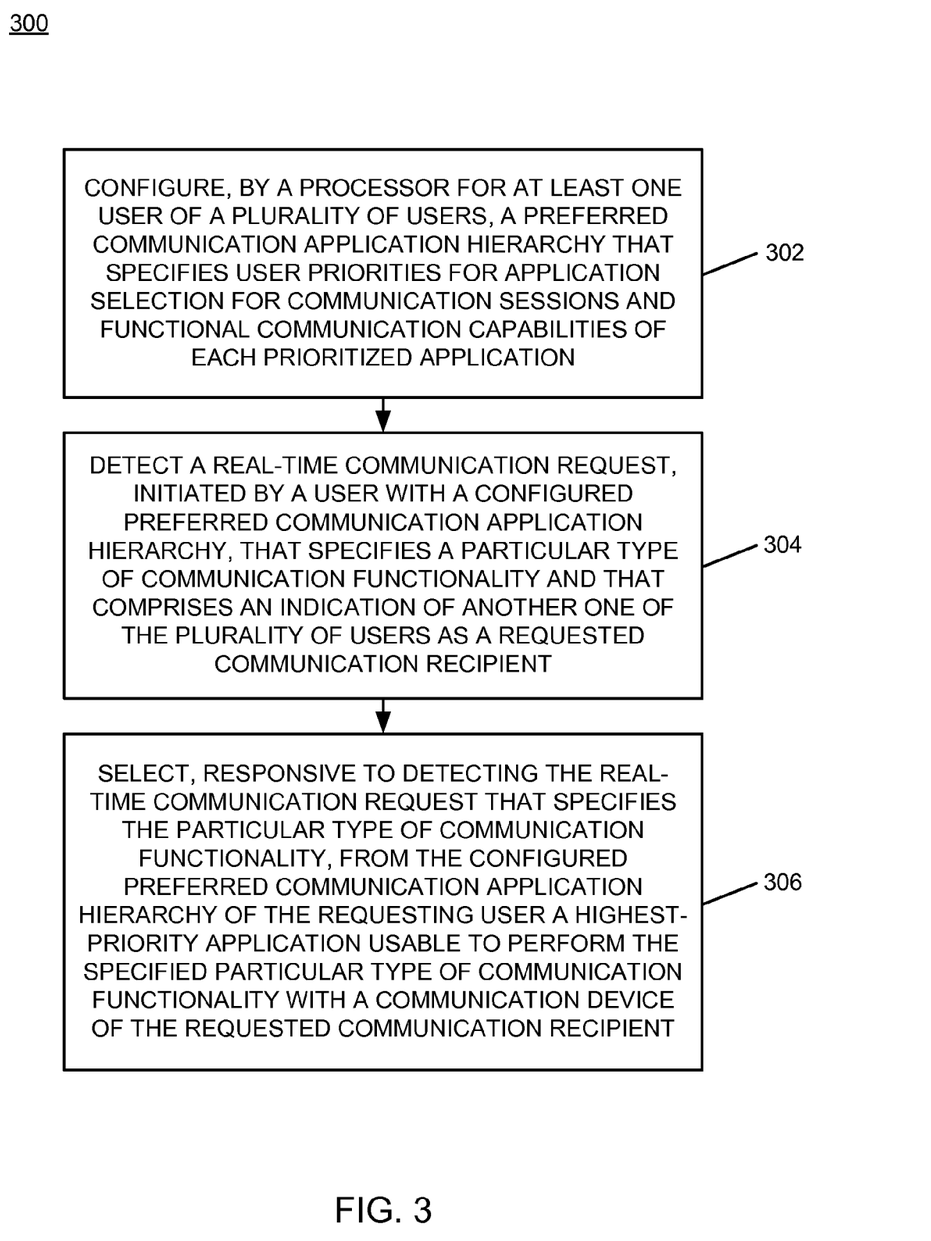
FIG. 3 is a flow chart of an example of an implementation of a process for application hierarchy specification with real-time functional selection according to an embodiment of the present subject matter.
Figure 4:
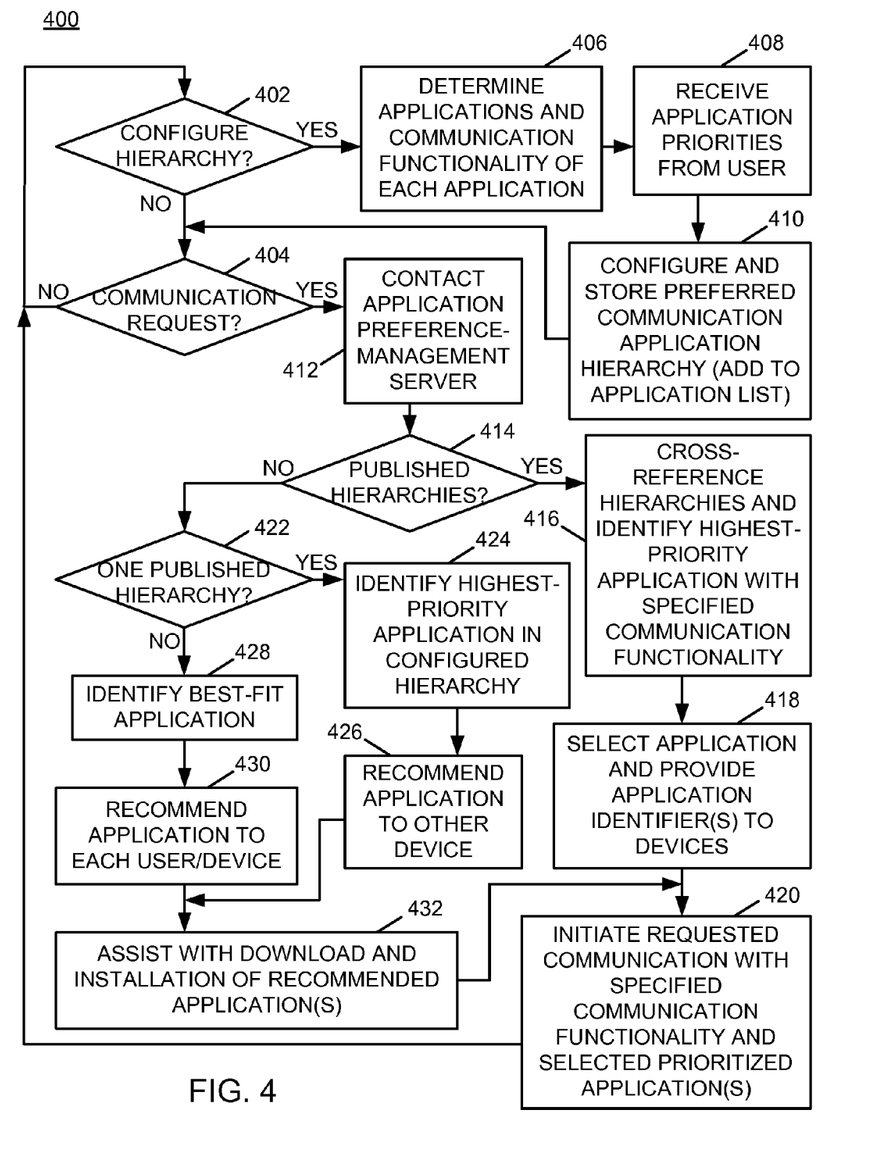
FIG. 4 is a flow chart of an example of an implementation of a process for application hierarchy specification with real-time functional selection that further evaluates preferred communication application hierarchies among users and assists users that lack suitable applications with application selection and installation according to an embodiment of the present subject matter.

FIG. 3 through FIG. 4 described below represent example processes that may be executed by devices, such as the core processing module 200, to perform the automated application hierarchy specification with real-time functional selection associated with the present subject matter. Many other variations on the example processes are possible and all are considered within the scope of the present subject matter. The example processes may be performed by modules, such as the application hierarchy processing module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for application hierarchy specification with real-time functional selection. The process 300 represents a processor-implemented method of performing the configuration of preferred communication application hierarchies and selection of prioritized applications as described herein. At block 302, the process 300 configures, by a processor for at least one user of a plurality of users, a preferred communication application hierarchy that specifies user priorities for application selection for communication sessions and functional communication capabilities of each prioritized application. At block 304, the process 300 detects a real-time communication request, initiated by a user with a configured preferred communication application hierarchy, that specifies a particular type of communication functionality and that comprises an indication of another one of the plurality of users as a requested communication recipient. At block 306, the process 300 selects, responsive to detecting the real-time communication request that specifies the particular type of communication functionality, from the configured preferred communication application hierarchy of the requesting user a highest-priority application usable to perform the specified particular type of communication functionality with a communication device of the requested communication recipient.

FIG. 4 is a flow chart of an example of an implementation of a process 400 for application hierarchy specification with real-time functional selection that further evaluates preferred communication application hierarchies among users and assists users that lack suitable applications with application selection and installation. The process 400 represents a processor-implemented method of performing the configuration of preferred communication application hierarchies, selection of prioritized applications, and communication initiation as described herein. At decision point 402, the process 400 makes a determination as to whether to configure a preferred communication application hierarchy for a user. In response to determining not to configure a preferred communication application hierarchy for a user, the process 400 makes a determination at decision point 404 as to whether a communication request has been detected. In response to determining that a communication request has not been detected, the process 400 returns to decision point 402 and iterates as described above. As such, the decision point 402 in conjunction with the decision point 404 represent a higher-level iterative loop of the process 400.

Returning to the description of decision point 402, the determination as to whether to configure a preferred communication application hierarchy for a user may be performed, for example, in response to a user logging in to an application preference-management server, such as the application preference-management server 108, and requesting generation and configuration of a preferred communication application hierarchy. Alternatively, configuration of preferred communication application hierarchies for one or more users may be configured/updated in real time responsive to communication requests and identification/download of applications usable to communicate between the respective user devices. As an additional alternative, responsive to download and installation of an application that provides appropriate communications functionality, the process 400 may also update an existing preferred communication application hierarchy of one or more users with the new application and communication functionality of the new application. As such, there are many possible events that may invoke configuration (and/or updating) of a preferred communication application hierarchy. The processing illustrated within the configuration section of the process 400 is illustrated on a per user basis for ease of illustration and description, with the understanding that the same processing may be performed for each user of the technology described herein.

In response to determining at decision point 402 to configure a preferred communication application hierarchy for one or more users, at block 406 the process 400 determines the applications installed on the user's communication device, along with the communication functionality of each application, for which a prioritized preferred communication application hierarchy is to be configured. At block 408, the process 400 receives application priorities from the user. At block 410, the process 400 configures and stores a preferred communication application hierarchy for the user. The preferred communication application hierarchy may be stored on an application preference-management server, such as the application preference-management server 108. It is again understood that the processing described above with respect to the process 400 may be performed for each user to configure a personalized and individualized preferred communication application hierarchy for each such user. It should additionally be noted that during additional iterations of the process 400, new applications that have been recommended/suggested and installed, as described in more detail below, may be configured within either a new or an existing preferred communication application hierarchy (e.g., added to the prioritized list) for any of the users of the technology described herein. In response to configuring and storing the preferred communication application hierarchy at block 410, the process 400 returns to decision point 404.

Returning to the description of decision point 404, a communication request may be detected for example responsive to a user of a communication device requesting a communication session with a particular other user that also has a communication device. For example, a user_1 (the requesting user) may request communication by video conference with a user_2 (the requested communication recipient).

As such, in response to determining at decision point 404 that a communication request has been detected, the process 400 contacts the application preference-management server (e.g., the application preference-management server 108) at block 412. The contact with the application preference-management server may include sending an identifier of the respective user communication devices and/or users to determine whether one or more of the respective users has a configured preferred communication application hierarchy. Alternatively, where the process 400 operates upon the application preference-management server 108, the processing at block 412 may be performed to search local accessible storage to determine whether one or more of the respective users has a configured preferred communication application hierarchy.

At decision point 414, the process 400 makes a determination as to whether one or more of the users identified in the communication request has a configured preferred communication application hierarchy. In response to determining that both users have a configured preferred communication application hierarchy, the process 400 cross-references the configured preferred communication application hierarchies of the requesting user and the requested communication recipient and identifies the highest-priority application with the specified communication functionality at block 416. At block 418, the process 400 selects the identified application from each of the respective preferred communication application hierarchies of the respective users and provides the application identifiers (IDs) to the respective devices for use in initiation of the requested communication. It should be noted that the process may either select a highest-priority different application listed within each of the respective configured preferred communication application hierarchies that provides the specified particular type of communication functionality, or may select a highest-priority identical application listed within each of the respective configured preferred communication application hierarchies that provides the specified particular type of communication functionality. For a selected identical application, it is understood that the respective application may be prioritized differently by the respective users, but may still be listed within each configured preferred communication application hierarchy at some user-specified priority level. At block 420, the process 400 initiates the requested communication with the specified communication functionality and selected prioritized applications. For example, the process 400 initiates communication between the communication device of the requested user and the communication device of the requested communication recipient using the selected highest-priority application(s). The process 400 returns to decision point 402 and iterates as described above.

Returning to the description of decision point 414, in response to determining that one or both users do not have a configured preferred communication application hierarchy, the process 400 makes an additional determination at decision point 422 as to whether at least one of the users has a configured preferred communication application hierarchy. In response to determining that at least one of the users has a configured preferred communication application hierarchy, the process 400 identifies a highest-priority application within the available configured preferred communication application hierarchy for use in establishing the requested communication at block 424. At block 426, the process 400 recommends (suggests) the identified highest-priority application to the other user(s) specified in the requested communication.

Alternatively, returning to the description of decision point 422, in response to determining that none of the users has a configured preferred communication application hierarchy, the process 400 identifies a best-fit application for use by the respective users for their requested communication at block 428. For example, where none of the users currently has an application that performs the particular type of communication functionality (e.g., video conferencing), the process 400 may evaluate other configured preferred communication application hierarchies of other users, and may identify a preferred (e.g., highest-priority) application that is specified by a majority of the users for the respective type of communication functionality. As such, the process 400 may integrate knowledge gained from priorities established by other users to assist new users of technology with identifying applications that many/multiple users find enjoyable to use and that fulfill the technical functionality aspects of the particular form of communication for which the applications are configured. At block 430, the process 400 recommends (suggests) the identified best-fit application to the user(s) specified in the requested communication. As described above, the application(s) recommended may be different for different users in accordance with the respective user's device capabilities and platform to accommodate for differences in application availability for different platforms.

In response to recommending the identified best-fit application to the user(s) specified in the requested communication at block 430, or in response to recommending the identified highest-priority application to the other user(s) specified in the requested communication at block 426, the process 400 assists with download and installation of the recommended application(s) at block 432. For example, the process 400 may identify one or more application stores (e.g., "App Stores") from which the application(s) may be downloaded to execute upon the respective user device platforms. Additionally, the process 400 may facilitate acquisition (e.g., purchase) of the application(s), and may perform other services to assist with installation and setup of the respective application(s).

In response to assisting with download and installation of the recommended application(s) at block 432, the process 400 also initiates communication between the communication device of the requested user and the communication device of the requested communication recipient using the selected highest-priority application(s) at block 420 (as described above for another branch of processing). The process 400 returns to decision point 402 and iterates as described above.

It should additionally be noted that were one or more applications have been downloaded and installed, the process 400 may iterate through block 406 through block 410 to add the new application(s) to the respective users configured preferred communication application hierarchies, or may create a new configured preferred communication application hierarchy for one or more users. The user may prioritize the new application among other applications, or the new application may be a first application within a newly-configured preferred communication application hierarchy and, in this situation, may be assigned a highest-priority position for the respective form of communication.

As such, the process 400 provides for configuration and management over time of configured preferred communication application hierarchies for users. The process 400 additionally assists with establishing communications using configured preferred communication application hierarchies, and assists users with identification of best-fit and/or high-priority applications used by other users for a communication session. Accordingly, the process 400 facilitates improved communications between users as technology develops over time and as feature sets of applications change over time.

As described above in association with FIG. 1 through FIG. 4, the example systems and processes provide application hierarchy specification with real-time functional selection. Many other variations and additional activities associated with application hierarchy specification with real-time functional selection are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
configuring, by a processor for at least one user of a plurality of users, a communication application hierarchy that specifies user assigned priorities for application selection from multiple applications that each support a particular type of communication functionality for communication sessions;
detecting a real-time communication request, initiated at a first communication device by a user with a configured communication application hierarchy, that specifies each of (i) the particular type of communication functionality and (ii) an indication of another one of the plurality of users as a requested communication recipient;
selecting from the configured communication application hierarchy of the requesting user, responsive to detecting the real-time communication request, a highest-priority application that shares protocol compatibility with a second application usable by a second communication device of the requested communication recipient to perform the specified particular type of communication functionality, where the shared protocol compatibility allows the selected highest-priority application and the second application to be different types of applications to accommodate different computing platforms and different user preferences for application selection at the first and second communication devices; and
in response to determining that the selected highest-priority application and the second application are different application types, initiating a handshake negotiation from the selected highest-priority application with the second application to coordinate application responsibility for application-layer translation of application-layer information formatting as a bridge for inter-application communication between the different application types.

2. The method of claim 1, where selecting from the configured communication application hierarchy of the requesting user, responsive to detecting the real-time communication request, the highest-priority application that shares the protocol compatibility with the second application usable by the second communication device of the requested communication recipient to perform the specified particular type of communication functionality comprises:

cross-referencing the configured communication application hierarchy of the requesting user with a configured communication application hierarchy of the requested communication recipient; and selecting a different highest-priority application listed within each of the respective configured communication application hierarchies to be used by the user and the requested communication recipient in response to determining that the respective different highest-priority applications each provide the specified particular type of communication functionality.

3. The method of claim 1, where selecting from the configured communication application hierarchy of the requesting user, responsive to detecting the real-time communication request, the highest-priority application that shares the protocol compatibility with the second application usable by the second communication device of the requested communication recipient to perform the specified particular type of communication functionality comprises:

cross-referencing the configured communication application hierarchy of the requesting user with a configured communication application hierarchy of the requested communication recipient; and selecting an identical highest-priority application listed within each of the respective configured communication application hierarchies as the highest-priority application.

4. The method of claim 1, further comprising initiating communication between the first communication device of the requesting user and the second communication device of the requested communication recipient using the selected highest-priority application.

5. The method of claim 1, further comprising:

determining that each of the first communication device of the requesting user and the second communication device of the requested communication recipient lack a prioritized application usable to perform the specified particular type of communication functionality;

identifying, by evaluation of configured communication application hierarchies of other users, an application preferred by a majority of the other users that provides the specified particular type of communication functionality; and suggesting the application preferred by the majority of the other users that provides the specified particular type of communication functionality to the requesting user and to the requested communication recipient.

6. The method of claim 1, further comprising:

determining that one of the first communication device of the requesting user and the second communication device of the requested communication recipient lacks a prioritized application usable to perform the specified particular type of communication functionality; and suggesting, to the respective user, installation of an application usable to perform the specified particular type of communication functionality on the one of the communication device of the requesting user and the communication device of the requested communication recipient.

7. The method of claim 6, further comprising:

assisting, responsive to a suggestion acknowledgement, the respective user of the one of the first communication device of the requesting user and the second communication device of the requested communication recipient with download and installation of the application; and adding the installed application as a prioritized-application to the configured communication application hierarchy of the respective user.

8. A system, comprising:

a memory; and a processor programmed to:

configure, within the memory for at least one user of a plurality of users, a communication application hierarchy that specifies user assigned priorities for application selection from multiple applications that each support a particular type of communication functionality for communication sessions;

detect a real-time communication request, initiated at a first communication device by a user with a configured communication application hierarchy, that specifies each of (i) the particular type of communication functionality and (ii) an indication of another one of the plurality of users as a requested communication recipient;

select from the configured communication application hierarchy of the requesting user, responsive to detecting the real-time communication request, a highest-priority application that shares protocol compatibility with a second application usable by a second communication device of the requested communication recipient to perform the specified particular type of communication functionality, where the shared protocol compatibility allows the selected highest-priority application and the second application to be different types of applications to accommodate different computing platforms and different user preferences for application selection at the first and second communication devices; and in response to determining that the selected highest-priority application and the second application are different application types, initiate a handshake negotiation from the selected highest-priority application with the second application to coordinate application responsibility for application-layer translation of application-layer information formatting as a bridge for inter-application communication between the different application types.

9. The system of claim 8, where, in being programmed to select from the configured communication application hierarchy of the requesting user, responsive to detecting the real-time communication request, the highest-priority application that shares the protocol compatibility with the second application usable by the second communication device of the requested communication recipient to perform the specified particular type of communication functionality, the processor is programmed to:

cross-reference the configured communication application hierarchy of the requesting user with a configured communication application hierarchy of the requested communication recipient; and select a different highest-priority application listed within each of the respective configured communication application hierarchies to be used by the user and the requested communication recipient in response to determining that the respective different highest-priority applications each provide the specified particular type of communication functionality.

10. The system of claim 8, where, in being programmed to select from the configured communication application hierarchy of the requesting user, responsive to detecting the real-time communication request, the highest-priority application that shares the protocol compatibility with the second application usable by the second communication device of the requested communication recipient to perform the specified particular type of communication functionality, the processor is programmed to:
- cross-reference the configured communication application hierarchy of the requesting user with a configured communication application hierarchy of the requested communication recipient; and
- select an identical highest-priority application listed within each of the respective configured communication application hierarchies as the highest-priority application.

11. The system of claim 8, where the processor is further programmed to:
- determine that each of the first communication device of the requesting user and the second communication device of the requested communication recipient lack a prioritized application usable to perform the specified particular type of communication functionality;
- identify, by evaluation of configured communication application hierarchies of other users, an application preferred by a majority of the other users that provides the specified particular type of communication functionality; and
- suggest the application preferred by the majority of the other users that provides the specified particular type of communication functionality to the requesting user and to the requested communication recipient.

12. The system of claim 8, where the processor is further programmed to:
- determine that one of the first communication device of the requesting user and the second communication device of the requested communication recipient lacks a prioritized application usable to perform the specified particular type of communication functionality; and
- suggest, to the respective user, installation of an application usable to perform the specified particular type of communication functionality on the one of the communication device of the requesting user and the communication device of the requested communication recipient.

13. The system of claim 12, where the processor is further programmed to:
- assist, responsive to a suggestion acknowledgement, the respective user of the one of the first communication device of the requesting user and the second communication device of the requested communication recipient with download and installation of the application; and
- add the installed application as a prioritized-application to the configured communication application hierarchy of the respective user.

14. A computer program product, comprising:
a computer readable storage medium having computer readable program code embodied therewith, where the computer readable storage medium is not a transitory signal per se and where the computer readable program code when executed on a computer causes the computer to:
- configure, for at least one user of a plurality of users, a communication application hierarchy that specifies user assigned priorities for application selection from multiple applications that each support a particular type of communication functionality for communication sessions;
- detect a real-time communication request, initiated at a first communication device by a user with a configured communication application hierarchy, that specifies each of (i) the particular type of communication functionality and (ii) an indication of another one of the plurality of users as a requested communication recipient;
- select from the configured communication application hierarchy of the requesting user, responsive to detecting the real-time communication request, a highest-priority application that shares protocol compatibility with a second application usable by a second communication device of the requested communication recipient to perform the specified particular type of communication functionality, where the shared protocol compatibility allows the selected highest-priority application and the second application to be different types of applications to accommodate different computing platforms and different user preferences for application selection at the first and second communication devices; and
- in response to determining that the selected highest-priority application and the second application are different application types, initiate a handshake negotiation from the selected highest-priority application with the second application to coordinate application responsibility for application-layer translation of application-layer information formatting as a bridge for inter-application communication between the different application types.

15. The computer program product of claim 14, where, in causing the computer to select from the configured communication application hierarchy of the requesting user, responsive to detecting the real-time communication request, the highest-priority application that shares the protocol compatibility with the second application usable by the second communication device of the requested communication recipient to perform the specified particular type of communication functionality, the computer readable program code when executed on the computer causes the computer to:
- cross-reference the configured communication application hierarchy of the requesting user with a configured communication application hierarchy of the requested communication recipient; and
- select a different highest-priority application listed within each of the respective configured communication application hierarchies to be used by the user and the requested communication recipient in response to determining that the respective different highest-priority applications each provide the specified particular type of communication functionality.

16. The computer program product of claim 14, where, in causing the computer to select from the configured communication application hierarchy of the requesting user, responsive to detecting the real-time communication request, the highest-priority application that shares the protocol compatibility with the second application usable by the second communication device of the requested communication recipient to perform the specified particular type of communication functionality, the computer readable program code when executed on the computer causes the computer to:
- cross-reference the configured communication application hierarchy of the requesting user with a configured communication application hierarchy of the requested communication recipient; and select an identical highest-priority application listed within each of the respective configured communication application hierarchies as the highest-priority application.

17. The computer program product of claim 14, where the computer readable program code when executed on the computer further causes the computer to initiate communication between the first communication device of the requesting user and the second communication device of the requested communication recipient using the selected highest-priority application.

18. The computer program product of claim 14, where the computer readable program code when executed on the computer further causes the computer to:
- determine that each of the first communication device of the requesting user and the second communication device of the requested communication recipient lack a prioritized application usable to perform the specified particular type of communication functionality;
- identify, by evaluation of configured communication application hierarchies of other users, an application preferred by a majority of the other users that provides the specified particular type of communication functionality; and
- suggest the application preferred by the majority of the other users that provides the specified particular type of communication functionality to the requesting user and to the requested communication recipient.

19. The computer program product of claim 14, where the computer readable program code when executed on the computer further causes the computer to:
- determine that one of the first communication device of the requesting user and the second communication device of the requested communication recipient lacks a prioritized application usable to perform the specified particular type of communication functionality; and
- suggest, to the respective user, installation of an application usable to perform the specified particular type of communication functionality on the one of the communication device of the requesting user and the communication device of the requested communication recipient.

20. The computer program product of claim 19, where the computer readable program code when executed on the computer further causes the computer to:
- assist, responsive to a suggestion acknowledgement, the respective user of the one of the first communication device of the requesting user and the second communication device of the requested communication recipient with download and installation of the application; and
- add the installed application as a prioritized-application to the configured communication application hierarchy of the respective user.

* * * * *